United States Patent
Young et al.

(10) Patent No.: US 10,955,606 B2
(45) Date of Patent: Mar. 23, 2021

(54) METHOD OF IMPRINTING TILT ANGLE LIGHT GRATINGS

(71) Applicant: Applied Materials, Inc., Santa Clara, CA (US)

(72) Inventors: Michael Yu-tak Young, Cupertino, CA (US); Ludovic Godet, Sunnyvale, CA (US); Robert Jan Visser, Menlo Park, CA (US); Wayne McMillan, San Jose, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 321 days.

(21) Appl. No.: 16/191,340

(22) Filed: Nov. 14, 2018

(65) Prior Publication Data

US 2019/0369321 A1    Dec. 5, 2019

Related U.S. Application Data

(60) Provisional application No. 62/677,969, filed on May 30, 2018.

(51) Int. Cl.
 *B29D 11/00*   (2006.01)
 *F21V 8/00*    (2006.01)

(52) U.S. Cl.
 CPC ........ *G02B 6/0065* (2013.01); *B29D 11/0075* (2013.01); *G02B 6/0036* (2013.01)

(58) Field of Classification Search
 CPC . B29D 11/0075; G02B 6/0065; G02B 6/0036
 See application file for complete search history.

(56) References Cited

U.S. PATENT DOCUMENTS

| 7,758,794 B2 * | 7/2010 | Chou ................... B29C 43/003 |
| | | 264/319 |
| 8,092,723 B2 * | 1/2012 | Laakkonen ............ B82Y 10/00 |
| | | 264/1.31 |
| 2006/0227425 A1 | 10/2006 | Kleemann et al. |
| 2009/0224416 A1 | 9/2009 | Laakkonen et al. |

(Continued)

FOREIGN PATENT DOCUMENTS

| CN | 101313234 A | 11/2008 |
| TW | 200404172 A | 3/2004 |
| WO | 2016/018737 A1 | 2/2016 |

OTHER PUBLICATIONS

Taiwanese Office Action issued to 108118378 dated Sep. 1, 2020.

(Continued)

*Primary Examiner* — Mathieu D Vargot
(74) *Attorney, Agent, or Firm* — Patterson + Sheridan LLP

(57) ABSTRACT

Embodiments described herein relate to methods of fabricating waveguide structures with gratings having front angles less than about 45° and back angles less than about 45°. The methods include imprinting stamps into nanoimprint resists disposed on substrates. The nanoimprint resists are subjected to a cure process. The stamps are released from the nanoimprint resist at a release angle $\vartheta$ using a release method. The nanoimprint resists are subjected to an anneal process to form a waveguide structure comprising a plurality of gratings with a front angle $\alpha$ and a back angle $\beta$ relative to a second plane of the surface of the substrate less than about 45°.

20 Claims, 7 Drawing Sheets

(56) References Cited

U.S. PATENT DOCUMENTS

2015/0034591 A1  2/2015  Vink et al.
2016/0231477 A1  8/2016  Saarikko et al.
2017/0131546 A1  5/2017  Woltman et al.

OTHER PUBLICATIONS

PCT Notification of Transmittal of the International Search Report and the Written Opinion of the International Searching Authority for International Application No. PCT/US2019/028985; dated Sep. 11, 2019; 9 total pages.

* cited by examiner

METHOD OF IMPRINTING TILT ANGLE LIGHT GRATINGS

CROSS-REFERENCE TO RELATED APPLICATIONS

This application claims benefit of U.S. Provisional Patent Application Ser. No. 62/677,969, filed May 30, 2018, which is herein incorporated by reference.

BACKGROUND

Field

Embodiments of the present disclosure generally relate to waveguide combiners for augmented, virtual, and mixed reality. More specifically, embodiments described herein provide for waveguide combiner fabrication utilizing nanoimprint lithography.

Description of the Related Art

Augmented reality enables an experience in which a user can still see through display lenses of glasses or other head-mounted display (HMD) devices to view a surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Waveguide combiners are used to assist in overlaying images. Generated light is in-coupled into a waveguide combiner, propagated through the waveguide combiner, out-coupled from the waveguide combiner, and overlaid on the ambient environment. Light is coupled into and out of the waveguide combiners using surface relief gratings. The intensity of the in-coupled and out-coupled light is controlled by surface relief gratings having sidewalls with a tilt angle. Waveguide combiners may require gratings with tilt angles less than about 45 degrees relative to the surface of the waveguide combiner or greater than about 45 degrees relative to the normal of the surface of the waveguide combiner. Fabricating waveguide structures for use as a waveguide combiner or a master for nanoimprint lithography can be challenging. In particular, fabricating a waveguide structure having gratings with tilt angles relative to the surface of the waveguide structure less than about 45 degrees can be challenging due to the difficultly of releasing a nanoimprint lithography stamp with tilt angles that are less than about 45 degrees from a nanoimprint resist without damaging the nanoimprint resist and the difficulty of configuring an angled etch tool to generate an ion beam at an angle less than about 45 degrees.

Accordingly, what is needed in the art are methods of forming waveguide structure having gratings with tilt angles that are less than about 45 degrees relative to the surface of the waveguide combiner using nanoimprint lithography stamp with tilt angles about 45 degrees or greater.

SUMMARY

In one embodiment, a waveguide structure fabrication method is provided. The method includes imprinting a stamp into a nanoimprint resist disposed on a surface of a substrate. The stamp comprises a plurality of inverse gratings with an inverse front angle $\alpha$ and an inverse back angle $\beta$ relative to a first plane of a backside surface of the stamp about 45° or greater and first dimensions. The nanoimprint resist is subjected to a cure process. The stamp is released from the nanoimprint resist at a release angle $\vartheta$ using a release method. The nanoimprint resist is subjected to an anneal process to form a waveguide structure comprising a plurality of gratings with a front angle $\alpha$ and a back angle $\beta$ relative to a second plane of the surface of the substrate less than about 45° and third dimensions.

In another embodiment, a waveguide structure fabrication method is provided. The method includes imprinting a stamp into a nanoimprint resist disposed on a surface of a substrate. The stamp comprises a plurality of inverse gratings with an inverse front angle $\alpha$ and an inverse back angle $\beta$ relative to a first plane of a backside surface of the stamp about 45° or greater and first dimensions. The nanoimprint resist is subjected to a cure process so that the nanoimprint resist is in a release state. The stamp is released from the nanoimprint resist in the release state using a release method of peeling the stamp from the nanoimprint resist in the release state at a release angle $\vartheta'$ to form a plurality of transition gratings with a transition front angle $\alpha'$ and a transition back angle $\beta'$ relative to a second plane of the surface of the substrate and second dimensions. The nanoimprint resist is subjected to an anneal process to form a waveguide structure from the nanoimprint resist in an anneal state comprising a plurality of gratings with a front angle $\alpha^1$ and a back angle $\beta^1$ relative to the second plane of the surface of the substrate less than about 45° and third dimensions.

In yet another embodiment, a waveguide structure fabrication method is provided. The method includes imprinting a stamp into a nanoimprint resist disposed on a surface of a substrate. The stamp comprises a plurality of inverse gratings with an inverse front angle $\alpha$ and an inverse back angle $\beta$ relative to a first plane of a backside surface the stamp about 45° or greater and first dimensions. The nanoimprint resist is subjected to a cure process so that the nanoimprint resist is in a release state. The stamp is released from the nanoimprint resist in the release state using a release method of lifting the stamp from the nanoimprint resist in the release state at a release angle $\vartheta''$ to form a plurality of transition gratings with a transition front angle $\alpha''$ and a transition back angle $\beta''$ relative to a second plane of the surface of the substrate and second dimensions. The nanoimprint resist is subjected to an anneal process to form a waveguide structure from the nanoimprint resist in an anneal state comprising a plurality of gratings with a front angle $\alpha^2$ and a back angle $\beta^2$ relative to the second plane of the surface of the surface of the substrate less than about 45° and third dimensions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to methods of fabricating waveguide combiners with gratings having front angles less than about 45° and back angles less than about 45°. The methods include imprinting stamps into nanoimprint resists disposed on substrates. The nanoimprint resists are subjected to a cure process. The stamps are released from the nanoimprint resist at a release angle $\vartheta$ using a release method. The nanoimprint resists are subjected to an anneal process to form a waveguide structure comprising a plurality of gratings with a front angle $\alpha$ and a back angle $\beta$ relative to a second plane of the substrate less than about 45°.

Figure 1:
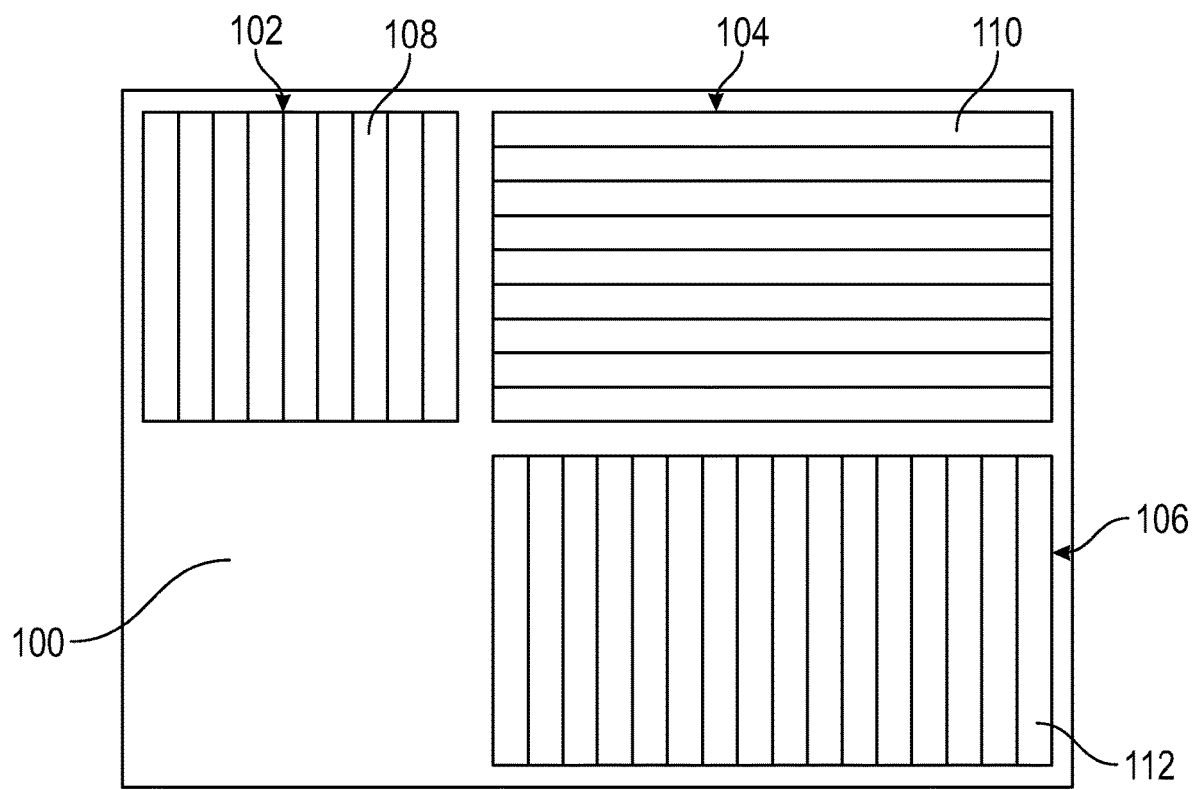
FIG. 1 is a perspective, frontal view of a waveguide combiner according to an embodiment.

FIG. 1 is a perspective, frontal view of a waveguide combiner 100. It is to be understood that the waveguide combiner 100 described below is an exemplary waveguide combiner. The waveguide combiner 100 includes an input coupling region 102 defined by a plurality of gratings 108, an intermediate region 104 defined by a plurality of gratings 110, and an output coupling region 106 defined by a plurality of gratings 112. The input coupling region 102 receives incident beams of light (a virtual image) having an intensity from a microdisplay. Each grating of the plurality of gratings 108 splits the incident beams into a plurality of modes, each beam having a mode. Zero-order mode (T0) beams are refracted back or lost in the waveguide combiner 100, positive first-order mode (T1) beams are coupled though the waveguide combiner 100 to the intermediate region 104, and negative first-order mode (T-1) beams propagate in the waveguide combiner 100 a direction opposite to the T1 beams. Ideally, the incident beams are split into T1 beams that have all of the intensity of the incident beams in order to direct the virtual image to the intermediate region 104. One approach to split the incident beam into T1 beams that have all of the intensity of the incident beams is to optimize the tilt angle of each grating of the plurality of gratings 108 to suppress the T-1 beams and the T0 beams. The T1 beams undergo total-internal-reflection (TIR) through the waveguide combiner 100 until the T1 beams come in contact with the plurality of gratings 110 in the intermediate region 104. A portion of the input coupling region 102 may have gratings 108 with a tilt angle relative to the surface of the waveguide combiner less than about 45° to suppress the T-1 beams and the T0 beams.

The T1 beams contact a grating of the plurality of gratings 110. The T1 beams are split into T0 beams refracted back or lost in the waveguide combiner 100, T1 beams that undergo TIR in the intermediate region 104 until the T1 beams contact another grating of the plurality of gratings 110, and T-1 beams that are coupled through the waveguide combiner 100 to the output coupling region 106. The T1 beams that undergo TIR in the intermediate region 104 continue to contact gratings of the plurality of gratings 110 until either the intensity of the T1 beams coupled through the waveguide combiner 100 to the intermediate region 104 is depleted, or remaining T1 beams propagating through the intermediate region 104 reach the end of the intermediate region 104. The plurality of gratings 110 must be tuned to control the T1 beams coupled through the waveguide combiner 100 to the intermediate region 104 in order to control the intensity of the T-1 beams coupled to the output coupling region 106 to modulate a field of view of the virtual image produced from the microdisplay from a user's perspective and increase a viewing angle from which a user can view the virtual image. One approach to control the T1 beams coupled through the waveguide combiner 100 to the intermediate region 104 is to optimize the tilt angle of each grating of the plurality of gratings 110 to control the intensity of the T-1 beams coupled to the output coupling region 106. A portion of the intermediate region 104 may have gratings 110 with a tilt angle relative to the surface of the waveguide combiner less than about 45° to control the intensity of the T-1 beams coupled to the output coupling region 106.

The T-1 beams coupled through the waveguide combiner 100 to the output coupling region 106 undergo TIR in the waveguide combiner 100 until the T-1 beams contact a grating of the plurality of gratings 112 where the T-1 beams are split into T0 beams refracted back or lost in the waveguide combiner 100, T1 beams that undergo TIR in the output coupling region 106 until the T1 beams contact another grating of the plurality of gratings 112, and T-1 beams coupled out of the waveguide combiner 100. The T1 beams that undergo TIR in the output coupling region 106 continue to contact gratings of the plurality of gratings 112 until either the intensity of the T-1 beams coupled through the waveguide combiner 100 to the output coupling region 106 is depleted, or remaining T1 beams propagating through the output coupling region 106 have reached the end of the output coupling region 106. The plurality of gratings 112 must be tuned to control the T-1 beams coupled through the waveguide combiner 100 to the output coupling region 106 in order to control the intensity of the T-1 beams coupled out of the waveguide combiner 100 to further modulate the field of view of the virtual image produced from the microdisplay from the user's perspective and further increase the viewing angle from which the user can view the virtual image. One approach to control the T-1 beams coupled through the waveguide combiner 100 to the output coupling region 106 is to optimize the tilt angle of each grating of the plurality of gratings 112 to further modulate the field of view and increase the viewing angle. A portion of the intermediate region 104 may have gratings 110 with a tilt angle relative to the surface of the waveguide combiner less than about 45° to further modulate the field of view and increase the viewing angle.

Figure 2:
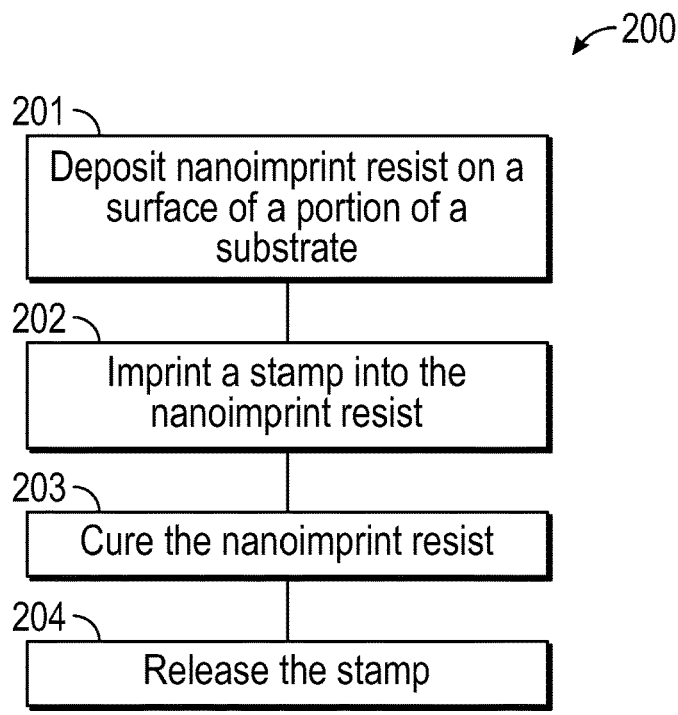
FIG. 2 is a flow diagram of a method for forming a waveguide combiner according to an embodiment.

One existing method of fabricating waveguide combiners utilizes nanoimprint lithography. FIG. 2 is a flow diagram of a method 200 for forming a waveguide structure of a waveguide combiner, such as the waveguide combiner 100. At operation 201, a nanoimprint resist is deposited on a surface of a portion of a substrate using a liquid material pour casting process, a spin-on coating process, a liquid spray coating process, a dry powder coating process, a screen printing process, a doctor blading process, a physical vapor deposition (PVD) process, a chemical vapor deposition (CVD) process, a flowable CVD (FCVD) process, or an atomic layer deposition (ALD) process. The nanoimprint resist may include at least one of spin on glass (SOG), flowable SOG, organic, inorganic, and hybrid (organic and inorganic) nanoimprintable materials that may contain at least one of silicon oxycarbide (SiOC), titanium dioxide ($TiO_2$), silicon dioxide ($SiO_2$), vanadium (IV) oxide ($VO_x$), aluminum oxide ($Al_2O_3$), indium tin oxide (ITO), zinc oxide (ZnO), tantalum pentoxide ($Ta_2O_5$), silicon nitride ($Si_3N_4$), titanium nitride (TiN), and zirconium dioxide ($ZrO_2$) containing materials. The materials of nanoimprint resist are partially selected based on the tilt angle of the gratings of a resulting waveguide structure formed from the method 200 and the refractive index of the substrate to control the in-coupling and out-coupling of light and facilitate light propagation through the waveguide combiner 100.

At operation 202, the nanoimprint resist disposed on the portion of the substrate is imprinted by a stamp. In one embodiment, the nanoimprint resist is heated before the stamp is imprinted. The waveguide pattern includes a grating pattern have a plurality of inverse gratings. Each grating of the plurality of inverse gratings has an inverse front angle relative to a first plane of a backside surface of the stamp and an inverse back angle relative to the a first plane of a backside surface of the stamp. The stamp is molded from a master and may be made from a semi-transparent material, such as fused silica or polydimethylsiloxane (PDMS) material, or a transparent material, such as a glass material or a plastic material, to allow the nanoimprint resist to be cured by exposure to electromagnetic radiation, such as infrared (IR) radiation or ultraviolet (UV) radiation. In one embodiment, the stamp comprises a rigid backing sheet, such as a sheet of glass, to add mechanical strength to the stamp. At operation 203, the nanoimprint resist on the surface of the substrate is cured to stabilize the nanoimprint resist. At operation 204, the stamp is released. The resulting waveguide structure includes a plurality of gratings that corresponds to the plurality of inverse gratings so that each grating of the plurality of gratings has a front angle, also known as a slant angle or tilt angle, relative to a second plane of the surface of the substrate and a back angle, also known as a slant angle or tilt angle, relative to the second plane of the surface. In one embodiment, waveguide structure of the portion of the substrate corresponds to the input coupling region 102, the intermediate region 104, and/or the output coupling region 106 of the waveguide combiner 100.

Fabricating waveguide structures with gratings having front angles less than about 45°, back angles less than about 45°, and tuned dimensions, such as grating height, residual layer height, grating top width, and grating bottom width, may be challenging with stamps having inverse gratings with inverse front angles and back angles less than about 45°. When imprinting stamp with inverse gratings having inverse front angles less than about 45°, inverse back angles less than about 45°, and high aspect ratios, the ratio of inverse grating height to inverse grating width, into a nanoimprint resist and curing the resist the resulting waveguide structure may have overlapping gratings making removing the stamp unachievable without damaging the gratings. For example, the aspect ratios may be about 2:1 to about 3:1.

Figure 3:
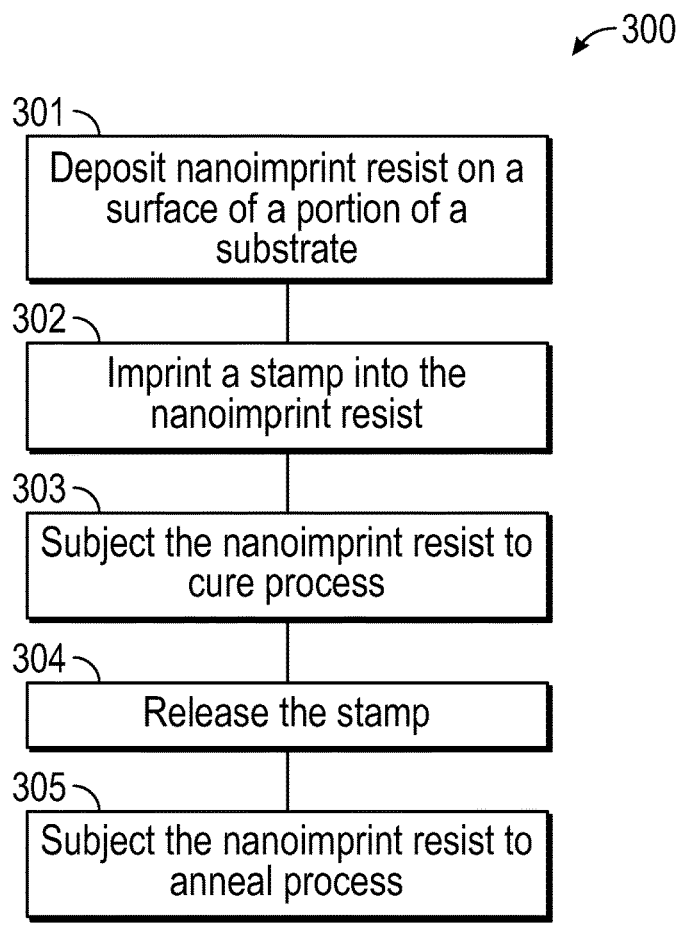
FIG. 3 is a flow diagram of a method for forming a waveguide combiner according to an embodiment.
Figure 4A:
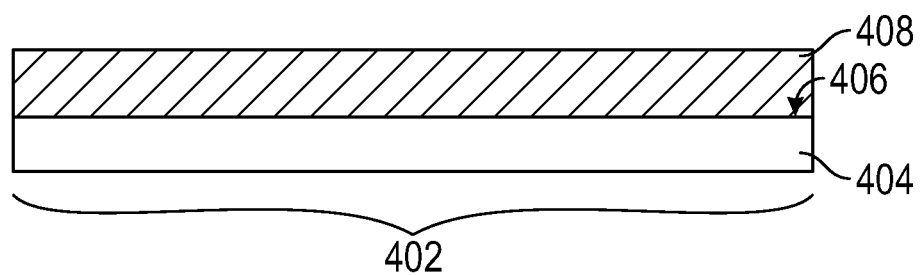
FIG. 4A-4F are schematic, cross-sectional views of a portion of a waveguide combiner according to an embodiment.

FIG. 3 is a flow diagram of a method 300 for forming a waveguide structure 400 shown in FIGS. 4A-4F. In one embodiment, waveguide structure 400 corresponds to the input coupling region 102, the intermediate region 104, and/or the output coupling region 106 of the waveguide combiner 100. At operation 301, as shown in FIG. 4A, a nanoimprint resist 408 is deposited on a surface 406 of a portion 402 of a substrate 404 using a liquid material pour casting process, a spin-on coating process, a liquid spray coating process, a dry powder coating process, a screen printing process, a doctor blading process, a PVD process, a CVD process, a FCVD process, or an ALD process. The nanoimprint resist may include at least one of SOG, flowable SOG, organic, inorganic, and/or hybrid organic and inorganic nanoimprintable materials that may contain SiOC, $TiO_2$, $SiO_2$, $VO_x$, $Al_2O_3$, ITO, ZnO, $Ta_2O_5$, $Si_3N_4$, TiN, and zirconium dioxide $ZrO_2$ containing materials. The materials of nanoimprint resist are selected based on the front angle, back angle, and tuned dimensions of a plurality of gratings of the waveguide structure 400 formed by the method 300. In one embodiment, the nanoimprint resist includes a percentage of a sol-gel solution that may contain $SiO_2$, silicon oxycarbide (SiOC), $ZrO_2$, or $TiO_2$ containing materials.

At operation 302, a stamp 410 is imprinted into the nanoimprint resist 408. In one embodiment, the nanoimprint resist 408 is heated to a preheat temperature before the stamp 410 is imprinted. The preheat temperature is at a temperature to promote evaporation of solvents in the nanoimprint resist 408. In one embodiment, the preheat temperature about 50° C. to about 60° C. The stamp 410 has a plurality of inverse gratings 414. The stamp 410 is molded from a master and may be made from a semi-transparent material, such as fused silica or polydimethylsiloxane (PDMS) material, or a transparent material, such as a glass material or a plastic material, to allow the nanoimprint resist to be cured by exposure to electromagnetic radiation, such as infrared (IR) radiation or ultraviolet (UV) radiation. In one embodiment, the stamp 410 may be coated with a mono-layer of anti-stick surface treatment coating, such as a fluorinated coating, so the stamp 410 can be mechanically removed by a machine tool or by hand peeling at a release angle $\vartheta'$. In another embodiment, the stamp 410 comprises a rigid backing sheet, such as a sheet of glass, to add mechanical strength to the stamp 410 to release the stamp 410 at a release angle $\vartheta''$.

Figure 4B:
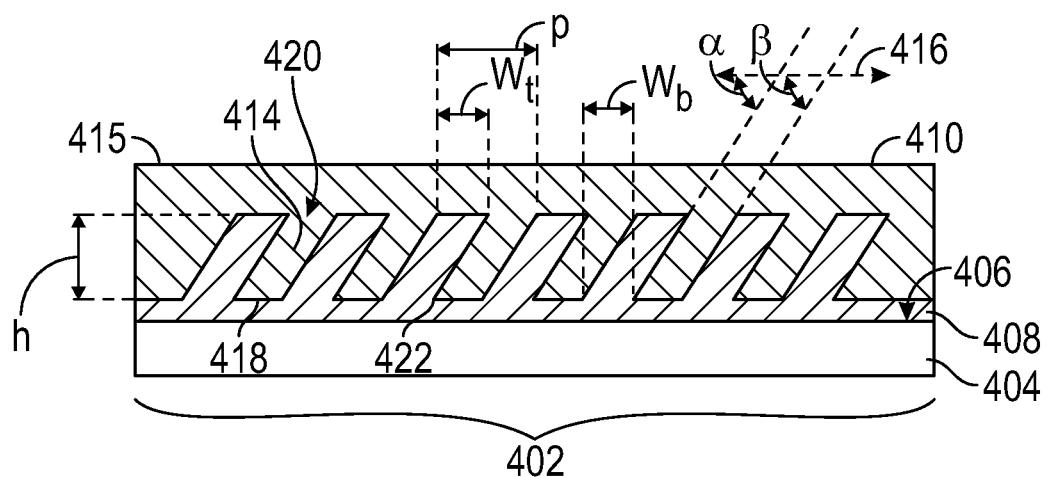

As shown in FIG. 4B, the stamp 410 has the plurality of inverse gratings with an inverse front angle $\alpha$ and an inverse back angle $\beta$ relative to a first plane 416 of the backside surface 415 of the stamp 410. The inverse front angle $\alpha$ and an inverse back angle $\beta$ are about 45° or greater. The plurality of inverse gratings 414 has first dimensions of a height h, a pitch p, a grating top width $w_t$, and a grating bottom width $w_b$ to account for the shrinkage of the nanoimprint resist 408 from a cure process to a release state and an anneal process to an anneal state and to account for a modification of a front angle and back angle, and second dimensions of the nanoimprint resist 408 in the release state as a result of the release method and the release angle of the stamp 410. In one embodiment, the nanoimprint resist 408 may shrink by 20%. Shrinking the nanoimprint resist 408 may increase the refractive index of the nanoimprint resist 408. The master has a pattern so that the stamp 410 molded from the master has a plurality of inverse gratings 414 having the height h, the pitch p, the grating top width $w_t$, and the grating bottom width $w_b$. The height h is a height from an inverse grating top 418 to an inverse grating bottom 420. The grating top width $w_t$ is the width of the inverse grating top 418 and the grating bottom width $w_b$ is the width of the inverse grating bottom 420. The pitch p is the distance between first edges 422 of the inverse grating top 418.

At operation 303, nanoimprint resist 408 is subjected to a cure process. Prior to the cure process the nanoimprint resist 408 is in a green state, also known as a gel state, meaning that the organic binders are present in the nanoimprint resist 408. The cure process includes exposing the nanoimprint resist 408 to electromagnetic radiation, such as infrared (IR)

radiation or ultraviolet (UV) radiation, until the nanoimprint resist reaches a release state. In the release state the nanoimprint resist 408 may still be in the green state so the nanoimprint resist 408 is malleable for modification of a front angle α' and back angle β', and dimensions of the nanoimprint resist 408 as a result of the release method and the release angle of the stamp 410. However, in the release state the amount of organic binders has decreased. The nanoimprint resist 408 is in the release state when the nanoimprint resist 408 reaches a cure temperature corresponding to the release state. In one embodiment, the cure temperature is about 30° C. to about 80° C.

Figure 4C:
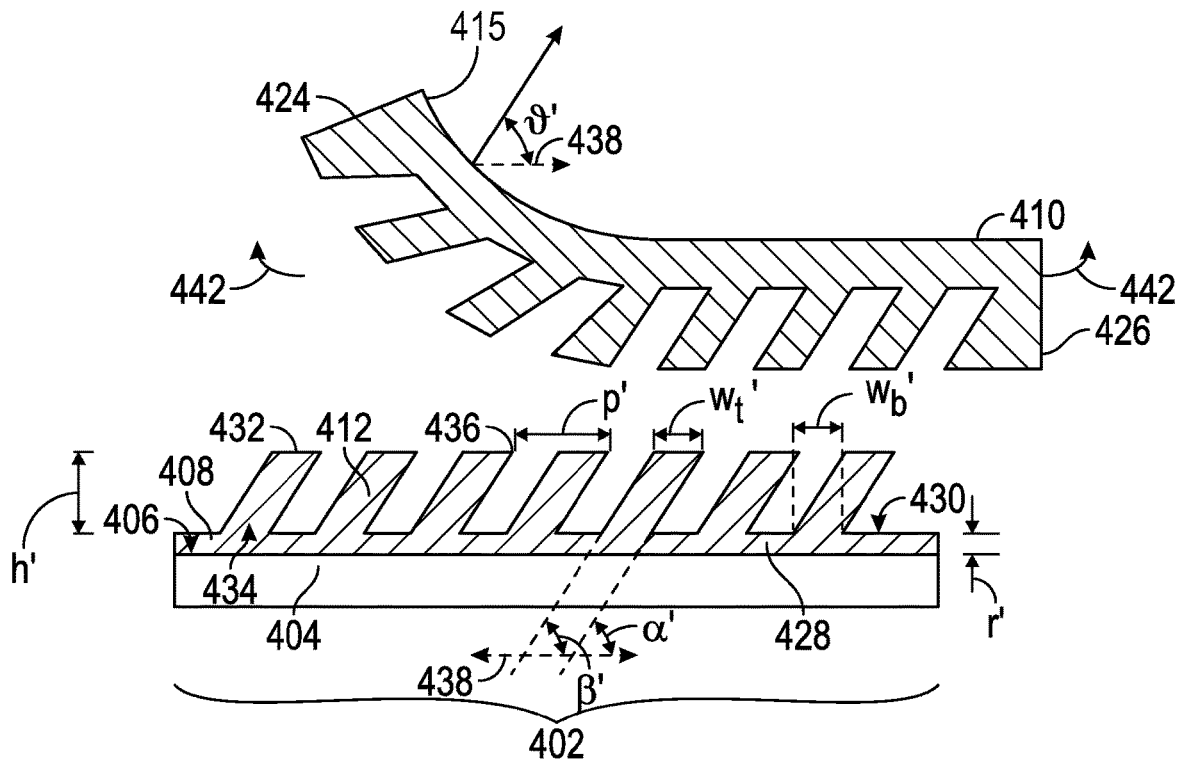

At operation 304, the stamp 410 is released from the nanoimprint resist 408 in the release state. As shown in FIG. 4C, stamp 410 is peeled at the release angle ϑ' relative to a second plane 438 of the surface 406 of the substrate 404 from the nanoimprint resist 408 in the release state. In one embodiment, the stamp 410 is mechanically peeled by a machine tool at the release angle ϑ'. In another embodiment, the stamp 410 is peeled by hand at the release angle ϑ'. In other embodiments, the release angle ϑ' is about 0° to about 180°. In one embodiment, the stamp 410 is peeled from a first end 424 and a second end 426 or from the second end 426 to the first end 424. For example, peeling from first end 424 to second end 426 may result in a lower front angle and back angle and peeling from second end 426 to first end 424 may result in higher front angle and back angle. In another embodiment, the stamp is peeled along a grating line direction 442. Peeling along the grating line direction 442 reduces pattern collapse. After the stamp 410 peeled at the release angle ϑ', the front angle, back angle, and dimensions of the nanoimprint resist 408 are modified. The nanoimprint resist 408 in the release state has a plurality of transition gratings 412 with a front angle α' and a back angle β'. The plurality of transition gratings 412 have second dimensions with a transition height h', a transition pitch p', a transition grating top width $w_t'$, a transition grating bottom width $w_b'$, and a transition residual layer height r'. The front angle α' and the back angle β' are relative to a second plane 438 of the surface 406 of the substrate 404. The transition residual layer height r' is a height from the surface 406 of the substrate 404 to a top 430 of the residual layer 428. The transition height h' is a height from a grating top 432 to a grating bottom 434. The transition grating top width $w_t'$ is the width of the grating top 432 and the transition grating bottom width $w_b'$ is the width of the grating bottom 434. The transition pitch p' is the distance between first edges 436 of the grating top 432. In one embodiment, the front angle α' and the back angle β, the transition height h', transition grating top width $w_t'$, the transition grating bottom width $w_b'$, and the transition residual layer height r' are tuned from the cure process and release of the stamp 410.

Figure 4D:
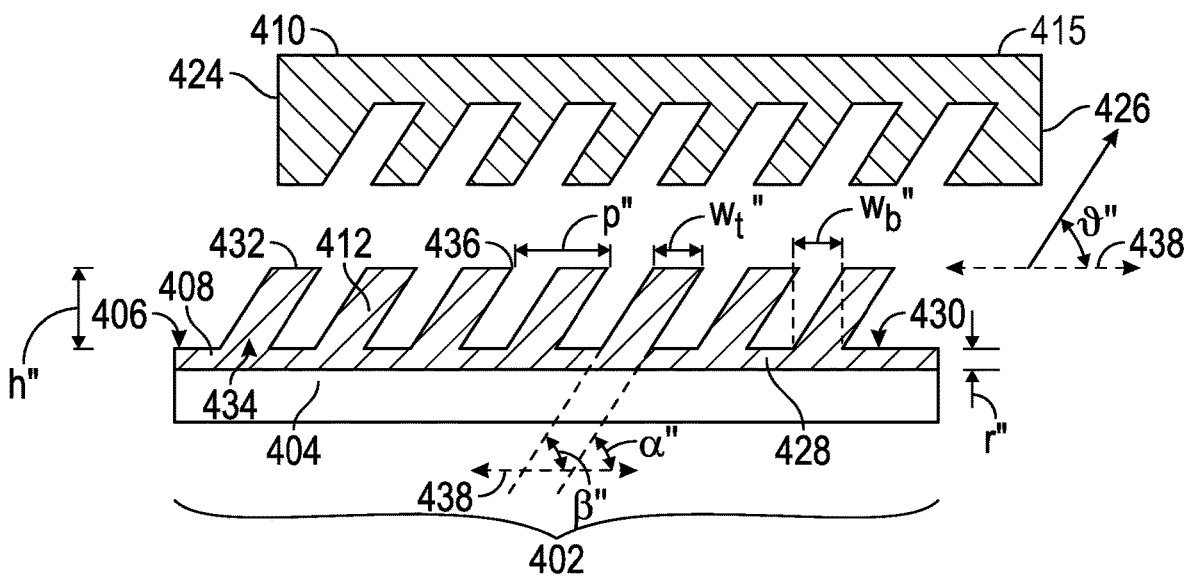

As shown in FIG. 4D, stamp 410 is peeled at the release angle ϑ" relative to the second plane 438 of the surface 406 of the substrate 404 from the nanoimprint resist 408 in the release state. In one embodiment, the stamp 410 is mechanically lifted by a machine tool at the release angle ϑ". In another embodiment, the stamp 410 is lifted by hand at the release angle ϑ". In some embodiments, the release angle ϑ" is about 0° to about 180°. A release angle ϑ" relative to the second plane 438 less than about 90° will result in a higher density of gratings. After the stamp 410 lifted at the release angle ϑ", the front angle, back angle, and dimensions of the nanoimprint resist 408 are modified. The nanoimprint resist 408 in the release state has a plurality of transition gratings 412 with a front angle α" and a back angle β", a transition height h", a transition pitch p", a transition grating top width $w_t"$, a transition grating bottom width $w_b"$, and a transition residual layer height r". In one embodiment, the front angle, back angle, and second dimensions of the transition gratings 412 from peeling and the front angle, back angle, and second dimensions of the transition gratings 412 from lifting are different as the vertical force from peeling may be controlled to affect the plurality of transition gratings 412. In one embodiment, the front angle α" and the back angle β", the transition height h", the transition grating top width $w_t"$, the transition grating bottom width $w_b"$, and the transition residual layer height r" are tuned from the cure process and release of the stamp 410.

Figure 4E:
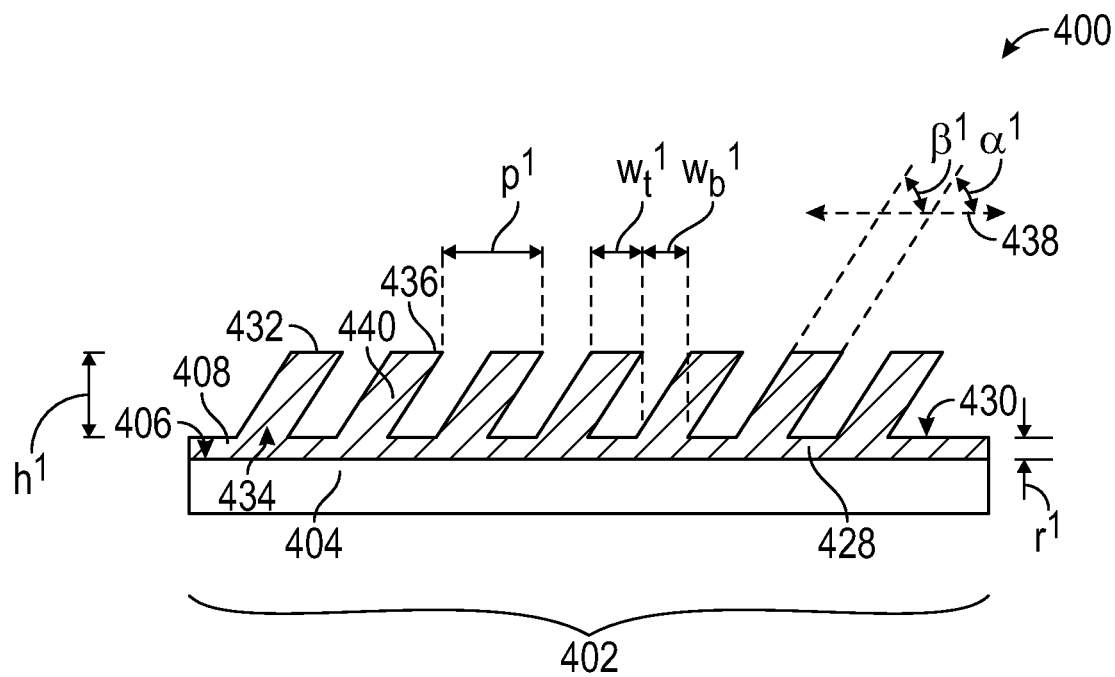
Figure 4F:
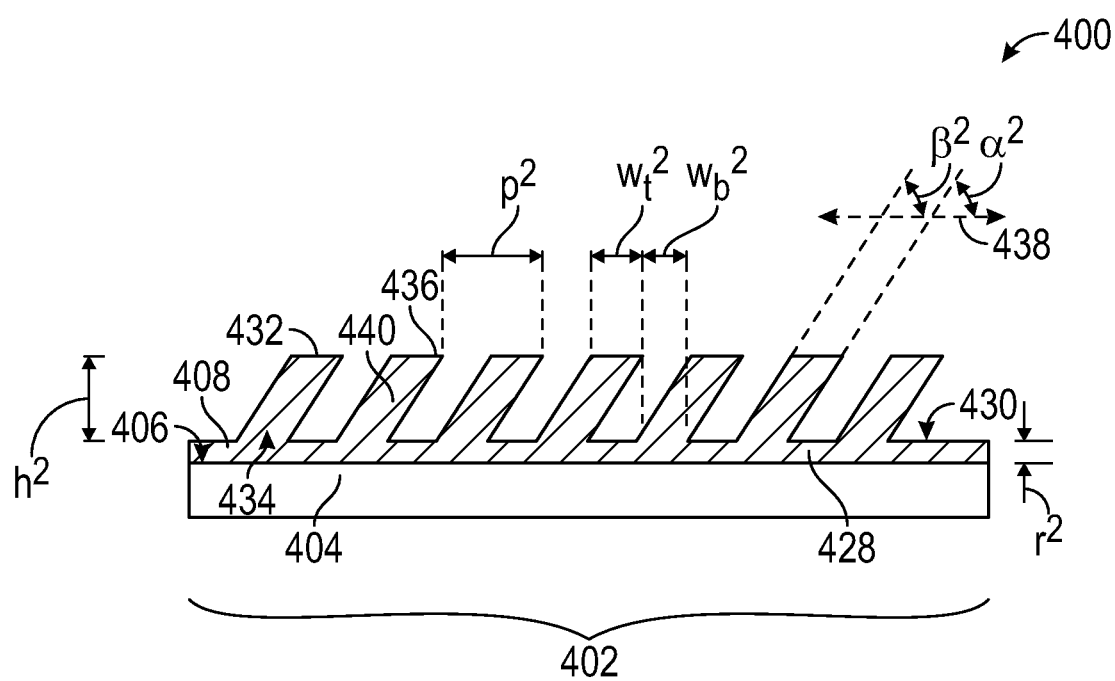

At operation 305, the waveguide structure 400 is formed by subjecting the nanoimprint resist 408 to an anneal process. The anneal process includes exposing the nanoimprint resist 408 to electromagnetic radiation, such as infrared (IR) radiation or ultraviolet (UV) radiation, until the nanoimprint resist reaches an anneal state. In the anneal state the nanoimprint resist 408 is rigid so the nanoimprint resist 408 is unmalleable and not in the green state. The nanoimprint resist 408 is in the anneal state when the nanoimprint resist 408 reaches an anneal temperature corresponding to the anneal state. In one embodiment, the anneal temperature is about 150° C. to about 250° C. The anneal process reduces the volume of the nanoimprint resist 408. Therefore, the waveguide structure 400 formed by peeling the stamp 410 at the release angle ϑ', as shown in FIG. 4E, has a plurality of gratings 440 with a front angle $α^1$ and a back angle $β^1$. The plurality of gratings 440 has third dimensions with a height $h^1$, a pitch $p^1$, a grating top width $w_t^1$, a grating bottom width $w_b^1$, and a residual layer height $r^1$. In one embodiment, the front angle $α^1$ and the back angle $β^1$, the height $h^1$, the grating top width $w_t^1$, the grating bottom width $w_b^1$, and the residual layer height $r^1$ are tuned from the anneal process. The waveguide structure 400 formed by lifting the stamp 410 at the release angle ϑ", as shown in FIG. 4F has a plurality of gratings 440 with a front angle $α^2$ and a back angle $β^2$. The plurality of gratings 440 has third dimensions with a height $h^2$, a pitch $p^2$, a grating top width $w_t^2$, a grating bottom width $w_b^2$, and a residual layer height $r^2$. In one embodiment, the front angle $α^2$ and the back angle $β^2$, the height $h^2$, the grating top width $w_t^2$, the grating bottom width $w_b^2$, and the residual layer height $r^2$ are tuned from the anneal process. In another embodiment, the front angle, back angle, and dimensions of the plurality of gratings 440 from peeling and the front angle, back angle, and dimensions of the transition gratings 412 from lifting are different. The front angle $α^1$, back angle $β^1$, front angle $α^2$, and back angle $β^2$ are less than about 45°. In another embodiment, the front angle $α^1$ and the back angle $β^1$ is about 32° to about 37°. In yet another embodiment, the front angle $α^2$ and the back angle $β^2$ are less than 37°, for example about 32° to about 37°.

Figure 4G:
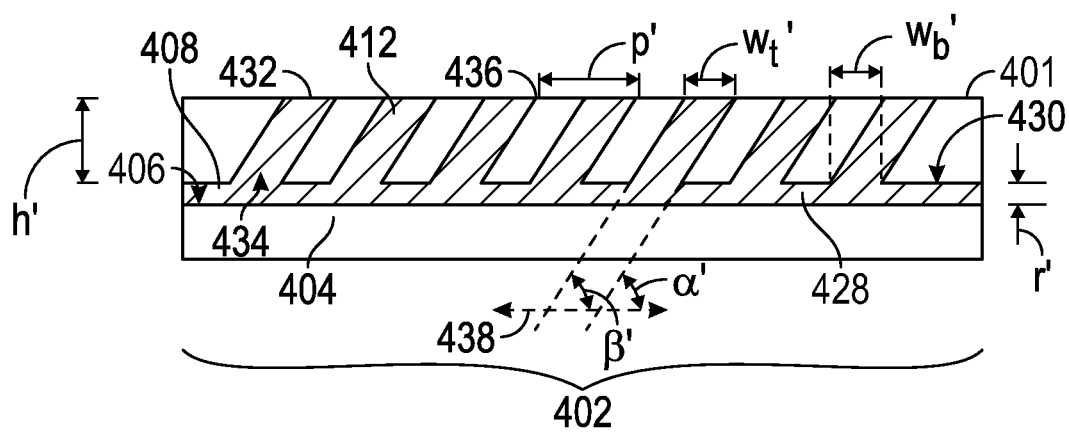
FIG. 4G-4J are schematic, cross-sectional views of a portion of a waveguide combiner according to an embodiment.
Figure 4H:
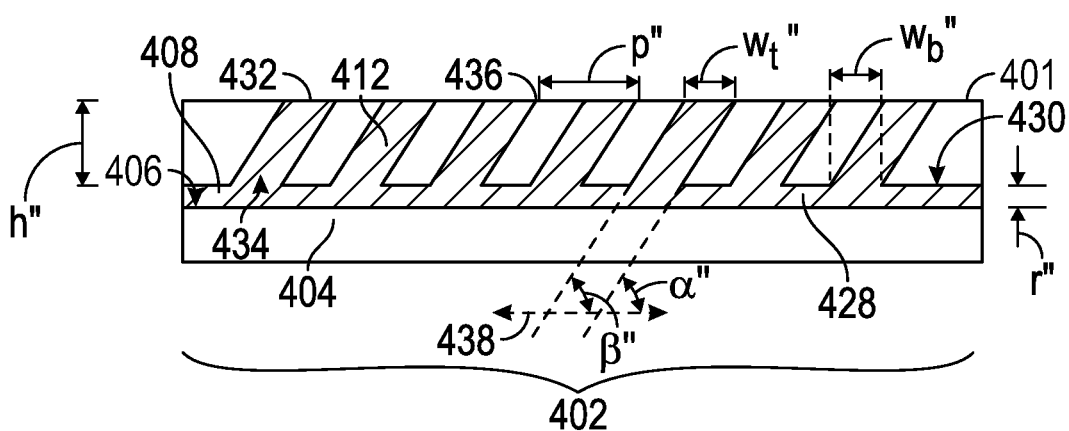
Figure 4I:
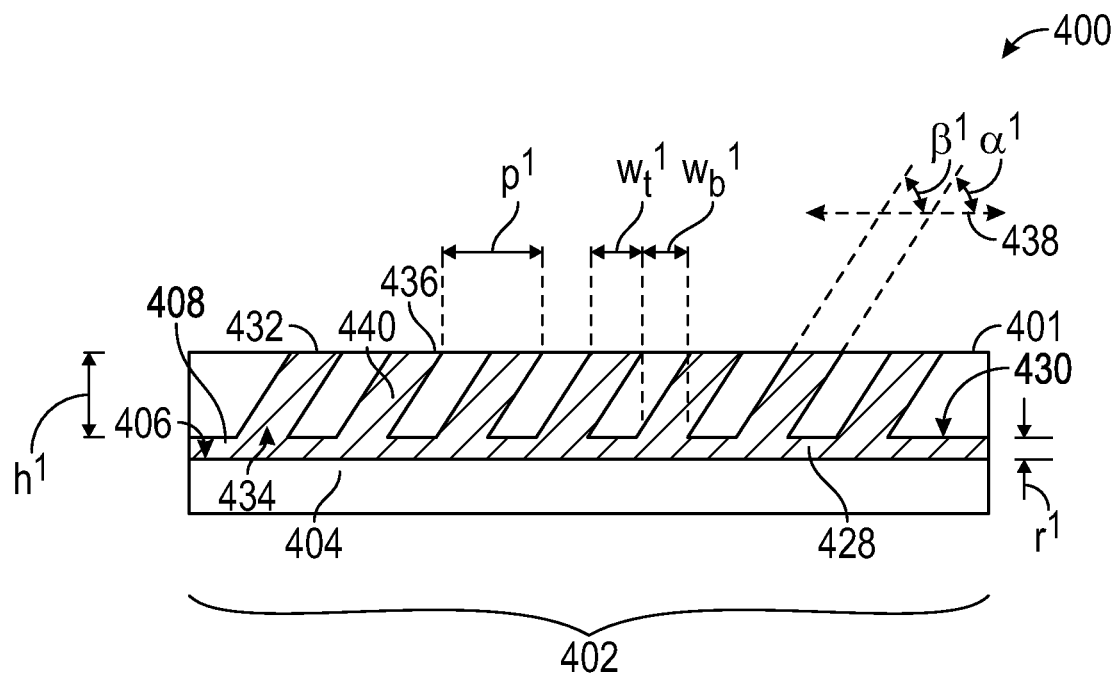
Figure 4J:
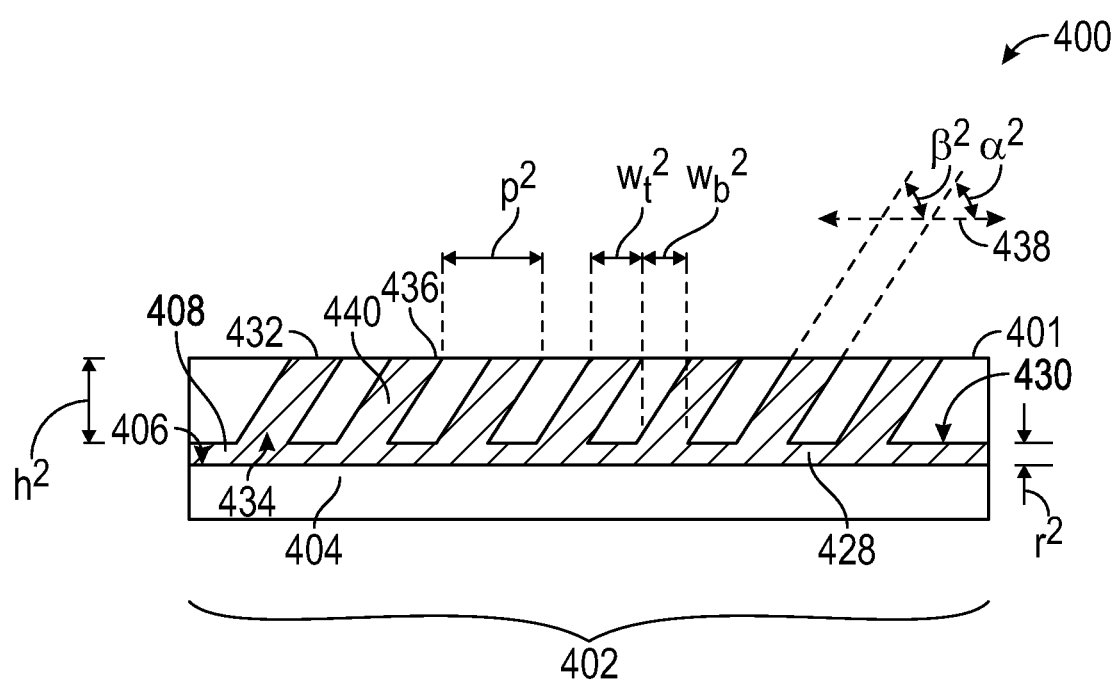

In another embodiment, after operation 304 and prior to operation 305, as shown in FIG. 4G and FIG. 4H, a backfill material 401 is deposited between each transition grating of the plurality of transition gratings 412. The material 401 has a second refractive index substantially matched to or greater than a first refractive index nanoimprint resist 408. The backfill material 401 includes at least one of SOG, flowable SOG, organic nano imprintable, inorganic nano imprintable, and hybrid (organic and inorganic) nano imprintable materials, such as at least one of SiOC, $TiO_2$, $SiO_2$, $VO_x$, $Al_2O_3$, ITO, ZnO, $Ta_2O_5$, $Si_3N_4$, TiN, and $ZrO_2$ containing materials. The backfill material 401 may be deposited between each transition grating of the plurality of transition gratings 412 using a liquid material pour casting process, a spin-on coating process, a liquid spray coating process, a dry powder coating process, a screen printing process, a doctor blading process, a PVD process, a CVD process, a FCVD process, or an ALD process. As shown in FIG. 4I and FIG. 4J, the nanoimprint resist 408 is subjected to the anneal process with the backfill material 401 due to the substantially matched first refractive index and second refractive index. The backfill material 401 further stresses the plurality of transition gratings 412 to decrease the front angle $\alpha^1$ and back angle $\beta^1$ plurality of gratings 440 of the structure 400 formed by peeling the stamp 410, front angle $\alpha^2$, and back angle $\beta^2$ structure 400 formed by lifting the stamp 410.

In summation, methods of fabricating waveguide combiners with gratings having front angles less than about 45°, back angles less than about 45°, and tuned dimensions are described herein are described herein. The stamp has the plurality of inverse gratings with an inverse front angle $\alpha$, an inverse back angle $\beta$, and dimensions to account for the reduction in volume of the nanoimprint resist from the cure process and the anneal process and to account for the modification of the front angle and back angle, and dimensions of the nanoimprint resist in the release state. As a result of the release method and the release angle of the stamp the plurality of gratings of the waveguide combiner has a front angle less than 45°, back angle less than 45°, and tuned dimensions.

While the foregoing is directed to examples of the present disclosure, other and further examples of the disclosure may be devised without departing from the basic scope thereof, and the scope thereof is determined by the claims that follow.

What is claimed is:

1. A waveguide structure fabrication method, comprising:
   imprinting a stamp into a nanoimprint resist disposed on a surface of a substrate, the stamp comprising:
      a plurality of inverse gratings having:
         an inverse front angle $\alpha$ relative to a first plane of a backside surface of the stamp, the inverse front angle $\alpha$ is about 45° or greater;
         an inverse back angle $\beta$ relative to the first plane, the inverse back angle $\beta$ is about 45° or greater; and
         first dimensions;
   subjecting the nanoimprint resist to a cure process;
   releasing the stamp from the nanoimprint resist at a release angle $\vartheta$ using a release method; and
   subjecting the nanoimprint resist to an anneal process to form a waveguide structure, the waveguide structure comprising:
      a plurality of gratings having:
         a front angle $\alpha$ relative to a second plane of the surface of the substrate, the front angle $\alpha$ is less than about 45°;
         a back angle $\beta$ relative to the second plane, the back angle $\beta$ is less than about 45°; and
         third dimensions.

2. The method of claim 1, wherein the nanoimprint resist is deposited on the surface of the substrate using a liquid material pour casting process, a spin-on coating process, a liquid spray coating process, a dry powder coating process, a screen printing process, a doctor blading process, a physical vapor deposition (PVD) process, a chemical vapor deposition (CVD) process, a flowable CVD (FCVD) process, or an atomic layer deposition (ALD) process.

3. The method of claim 1, wherein the nanoimprint resist comprises at least one of spin on glass (SOG), flowable SOG, organic, inorganic, and hybrid (organic and inorganic) nanoimprintable materials.

4. The method of claim 3, wherein the nanoimprintable materials comprise at least one of silicon oxycarbide (SiOC), titanium dioxide (TiO$_2$), silicon dioxide (SiO$_2$), vanadium (IV) oxide (VO$_x$), aluminum oxide (Al$_2$O$_3$), indium tin oxide (ITO), zinc oxide (ZnO), tantalum pentoxide (Ta$_2$O$_5$), silicon nitride (Si$_3$N$_4$), titanium nitride (TiN), and zirconium dioxide (ZrO$_2$) containing materials.

5. The method of claim 4, wherein the nanoimprint resist includes a sol-gel solution.

6. The method of claim 1, wherein the anneal process comprises exposing the nanoimprint resist to electromagnetic radiation until the nanoimprint resist reaches an anneal state.

7. The method of claim 6, wherein the nanoimprint resist is in the anneal state when the nanoimprint resist reaches an anneal temperature of about 150° C. to about 250° C.

8. The method of claim 1, wherein the cure process comprises exposing the nanoimprint resist to electromagnetic radiation until the nanoimprint resist reaches a release state.

9. The method of claim 8, wherein the nanoimprint resist is in the release state when the nanoimprint resist reaches a cure temperature of about 30° C. to about 80° C.

10. The method of claim 8, wherein the stamp is coated with a mono-layer of anti-stick surface treatment coating so the stamp is removed by peeling at a release angle $\vartheta'$.

11. The method of claim 8, wherein the stamp comprises a rigid backing sheet to add mechanical strength to the stamp to release the stamp at a release angle $\vartheta''$.

12. The method of claim 10, wherein the release method of peeling the stamp from the nanoimprint resist at the release angle $\vartheta'$ forms a plurality of transition gratings, the plurality of transition gratings having:
   a transition front angle $\alpha'$ relative to the second plane of the surface of the substrate;
   a transition back angle $\beta'$ relative to the second plane; and
   second dimensions.

13. The method of claim 11, wherein the release method of lifting the stamp from the nanoimprint resist at the release angle $\vartheta''$ forms a plurality of transition gratings, the plurality of transition gratings having:
   a transition front angle $\alpha''$ relative to the second plane of the surface of the substrate;
   a transition back angle $\beta''$ relative to the second plane; and
   second dimensions.

14. A waveguide structure fabrication method, comprising:
   imprinting a stamp into a nanoimprint resist disposed on a surface of a substrate, the stamp comprising:
      a plurality of inverse gratings having:
         an inverse front angle $\alpha$ relative to a first plane of a backside surface of the stamp, the inverse front angle $\alpha$ is about 45° or greater;
         an inverse back angle $\beta$ relative to the first plane, the inverse back angle $\beta$ is about 45° or greater; and
         first dimensions;
   subjecting the nanoimprint resist to a cure process so that the nanoimprint resist is in a release state;
   releasing the stamp from the nanoimprint resist in the release state, the releasing the stamp comprises using a release method of peeling the stamp from the nanoimprint resist in the release state at a release angle $\vartheta'$ to form a plurality of transition gratings, the plurality of transition gratings having:
      a transition front angle $\alpha'$ relative to a second plane of the surface of the substrate;

a transition back angle $\beta'$ relative to the second plane; and second dimensions; and subjecting the nanoimprint resist to an anneal process; the anneal process comprises forming a waveguide structure from the nanoimprint resist in an anneal state, the waveguide structure comprising:

a plurality of gratings having:
- a front angle $\alpha^1$ relative to the second plane of the surface of the substrate, the front angle $\alpha^1$ is less than about 45°;
- a back angle $\beta^1$ relative to the second plane, the back angle $\beta^1$ is less than about 45°; and
- third dimensions.

15. The method of claim 13, wherein the inverse front angle $\alpha$, the inverse back angle $\beta$, and the first dimensions of the stamp are selected to account for a reduction of the nanoimprint resist from the cure process and the anneal process and to account for the release method of peeling the stamp at the release angle $\vartheta'$ for the front angle $\alpha^1$, the back angle $\beta^1$, and the third dimensions.

16. The method of claim 14, wherein:
the first dimensions comprise a height h, a pitch p, a grating top width $w_t$, and a grating bottom width $w_b$;
the second dimensions comprise a transition height h', an transition pitch p', an transition grating top width $w_t'$, an transition grating bottom width $w_b'$, and a transition residual layer height r'; and
the third dimensions comprise a height $h^1$, a pitch $p^1$, a grating top width $w_t^1$, a grating bottom width $w_b^1$, and a residual layer height $r^1$.

17. A waveguide structure fabrication method, comprising:

imprinting a stamp into a nanoimprint resist disposed on a surface of a substrate, the stamp comprising:

a plurality of inverse gratings having:
- an inverse front angle $\alpha$ relative to a first plane of a backside surface of the stamp, the inverse front angle $\alpha$ is about 45° or greater;
- an inverse back angle $\beta$ relative to the first plane, the inverse back angle $\beta$ is about 45° or greater; and
- first dimensions;

subjecting the nanoimprint resist to a cure process so that the nanoimprint resist is in a release state;

releasing the stamp from the nanoimprint resist in the release state, the releasing the stamp comprises using a release method of lifting the stamp from the nanoimprint resist in the release state at a release angle $\vartheta''$ to form a plurality of transition gratings, the plurality of transition gratings having:
- a transition front angle $\alpha''$ relative to a second plane of the surface of the substrate;
- a transition back angle $\beta''$ relative to the second plane; and
- second dimensions; and subjecting the nanoimprint resist to an anneal process; the anneal process comprises forming a waveguide structure from the nanoimprint resist in an anneal state, the waveguide structure comprising:

a plurality of gratings having:
- a front angle $\alpha^2$ relative to the second plane of the surface of the substrate, the front angle $\alpha^2$ is less than about 45°;
- a back angle $\beta^2$ relative to the second plane, the back angle $\beta^1$ is less than about 45°; and
- third dimensions.

18. The method of claim 13, wherein the inverse front angle $\alpha$, the inverse back angle $\beta$, and the first dimensions of the stamp are selected to account for a reduction of the nanoimprint resist from the cure process and the anneal process and to account for the release method of lifting the stamp at the release angle $\vartheta''$ for the front angle $\alpha^2$, the back angle $\beta^2$, and the third dimensions.

19. The method of claim 14, wherein the first dimensions comprise a height h, a pitch p, a grating top width $w_t$, and a grating bottom width $w_b$.

20. The method of claim 14, wherein the second dimensions comprise a transition height h", an transition pitch p", an transition grating top width $w_t'$, an transition grating bottom width $w_b''$, and a transition residual layer height r" and the third dimensions comprise a height $h^2$, a pitch $p^2$, a grating top width $W_t^2$, a grating bottom width $W_b^2$, and a residual layer height $r^2$.

* * * * *